US009179343B2

(12) United States Patent
Yang et al.

(10) Patent No.: US 9,179,343 B2
(45) Date of Patent: Nov. 3, 2015

(54) TECHNIQUES FOR CROSS-DEVICE RADIO SIGNAL STRENGTH CALIBRATION

(71) Applicant: Intel Corporation, Santa Clara, CA (US)

(72) Inventors: Xue Yang, Arcadia, CA (US); Lei Yang, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 112 days.

(21) Appl. No.: 14/038,721

(22) Filed: Sep. 26, 2013

(65) Prior Publication Data

US 2015/0087239 A1    Mar. 26, 2015

(51) Int. Cl.
*H04W 24/08* (2009.01)

(52) U.S. Cl.
CPC ..................... *H04W 24/08* (2013.01)

(58) Field of Classification Search
USPC ................ 455/422.1, 423, 424, 456.1, 67.11, 455/67.14, 550.1, 115.1, 226.1, 226.2, 455/251.1
See application file for complete search history.

(56) References Cited

U.S. PATENT DOCUMENTS

| 7,212,798 | B1* | 5/2007 | Adams et al. | 455/251.1 |
| 2005/0266855 | A1* | 12/2005 | Zeng et al. | 455/456.1 |
| 2006/0087425 | A1* | 4/2006 | Haeberlen et al. | 455/456.1 |
| 2014/0357196 | A1* | 12/2014 | Mayor et al. | 455/67.11 |

* cited by examiner

*Primary Examiner* — Thanh Le
(74) *Attorney, Agent, or Firm* — Kacvinsky Daisak Bluni PLLC

(57) ABSTRACT

An apparatus may include a memory to store a first radio signal strength indicator (RSSI) data set comprising first data entries for RSSI detected from a multiplicity of transmission sources by a first wireless device of a first device type, and to store a second RSSI data set comprising second data entries for RSSI detected from the multiplicity of transmission sources by a second wireless device of a second device type; and a cross-device radio calibration engine to receive the first RSSI data set and second RSSI data set and generate a cross-calibrated RSSI function comprising a function that reduces differences between the first RSSI data set and the second RSSI data set. Other embodiments are disclosed and claimed.

28 Claims, 13 Drawing Sheets

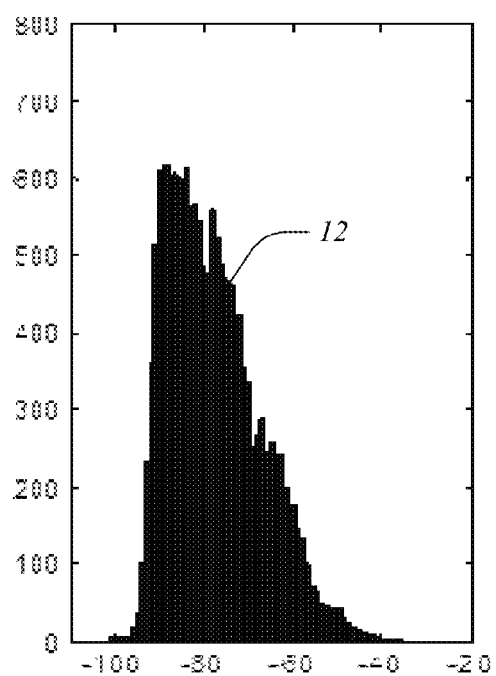 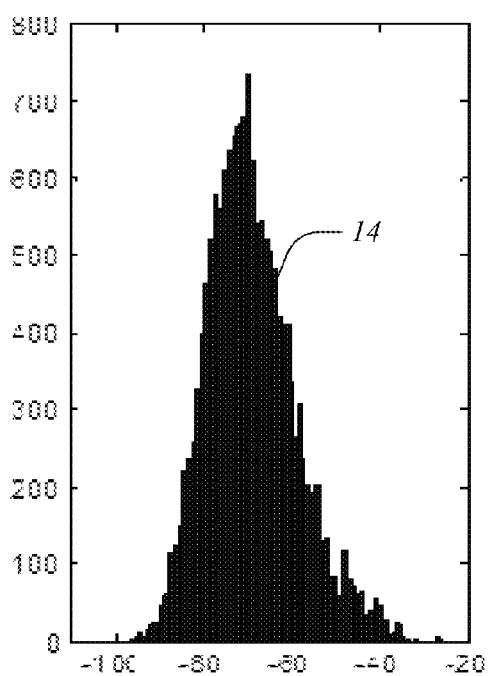
*FIG. 1A*  *FIG. 1B*

| Estimated scan location of the $m_{th}$ entry $(x_m, y_m)$ | RSSI Measurements | | | |
|---|---|---|---|---|
| $x_1, y_1$ | Access Point 1 $RSSI_1(1)$ | Access Point 2 $RSSI_1(2)$ | ... | Access Point K $RSSI_1(K)$ |
| $x_2, y_2$ | Access Point 1 $RSSI_2(1)$ | Access Point 2 $RSSI_2(2)$ | ... | Access Point K $RSSI_2(K)$ |
| ⋮ | | | | |
| $x_n, y_n$ | Access Point 1 $RSSI_n(1)$ | Access Point 2 $RSSI_n(2)$ | ... | Access Point K $RSSI_n(k)$ |

*FIG. 6*

| Calibration Method | Average Location Error (m) | Maximum Location Error (m) |
|---|---|---|
| No Calibration | 11.72 | 55.57 |
| Least Squares | 2.19 | 18.14 |
| Chi Square | 2.07 | 7.5 |
| Gaussian Reshape | 3.02 | 7.9 |
| Max/min Reshape | 3.12 | 7.52 |

TECHNIQUES FOR CROSS-DEVICE RADIO SIGNAL STRENGTH CALIBRATION

TECHNICAL FIELD

Embodiments described herein generally relate to wireless communications and in particular to location determination for mobile wireless devices.

BACKGROUND

WiFi based indoor location technologies have attracted a lot of attention in the past decade given the wide deployment of WLAN infrastructure. At present there are several industry efforts underway to develop technology to determine mobile device locations basing on WiFi signal strength (e.g., RSSI). In one example WiFi RSSI may be used to estimate mobile device distance from the known locations of Access Points, which can then be used to pinpoint device location using trilateration techniques. In another example WiFi RSSI is employed as a "fingerprint" measurement, in which the mobile device location is estimated through WiFi signal measurements from multiple access points, which signal measurements are matched against a pre-calibrated fingerprint data set for a given location. Thus, if the set of RSSI WiFi signals reported by a mobile device matches a given fingerprint data set, the mobile device can be pinpointed at the location associated with the fingerprint data set.

However, each of these techniques is subject to error due to a phenomenon that is termed herein "device diversity." The term device diversity refers to the general situation in which different mobile devices and in particular different device models can report different RSSI readings given the same received reference signal. In other words, two different devices positioned at the exact same location at the same time that are receiving the same radio signal(s) may report different RSSI information. In general, the RSSI reading is affected by transceiver design, radio calibration, antenna placement, etc. Thus, the accuracy of determination of location based upon RSSI information may vary among different devices, such that any locationing system that uses RSSI information to determine location generates a less robust determination of device location as a whole.

It is with respect to these and other considerations that the present improvements have been needed.

BRIEF DESCRIPTION OF THE DRAWINGS

FIGS. 1A and 1B present representative RSSI histograms collected from a smartphone type wireless device and a tablet type wireless device.

FIG. 6 depicts an exemplary data structure that may be output from an optimization engine for tagging location.

FIG. 8 depicts results of resulting location accuracy determined from measurements using the different calibration procedures of the present embodiments.

DETAILED DESCRIPTION

Figure 2:
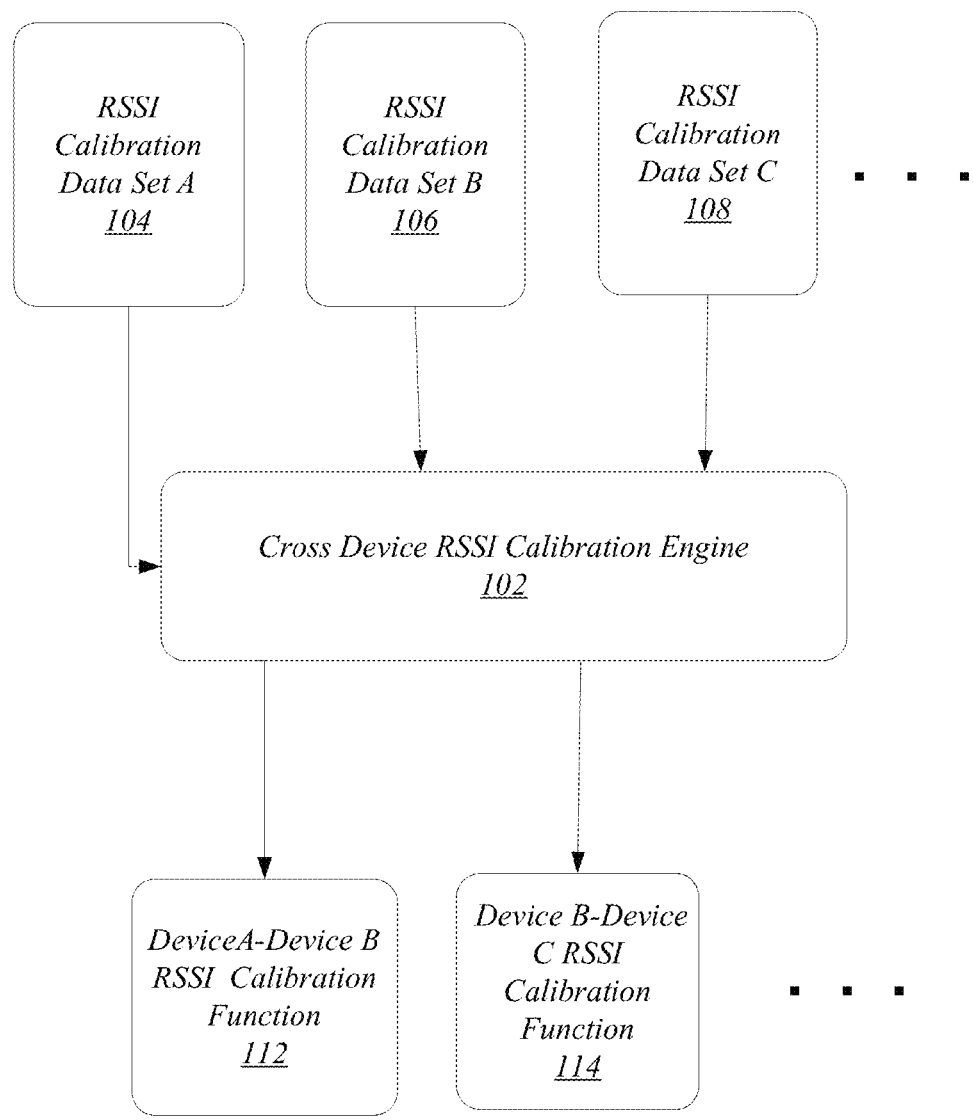
FIG. 2 depicts one example of a cross-device calibration system consistent with the present embodiments.

Some embodiments of a communications system may be implemented with a radio technology such as the Institute of Electrical and Electronics Engineering (IEEE) IEEE 802.11 (WiFi), 802.16 (WiMAX), IEEE 802-20, the 3rd Generation Partnership Project (3GPP) Evolved Universal Mobile Telecommunication System (UMTS) Terrestrial Radio Access (UTRA) (E-UTRA), among others. IEEE 802.16m is an evolution of IEEE 802.16e, and provides backward compatibility with an IEEE 802.16-based system. The UTRA is a part of UMTS. The 3GPP long term evolution (LTE) is a part of an evolved UMTS (E-UMTS) using the E-UTRA. LTE-advances (LTE-A) is an evolution of the 3GPP LTE and is also referred to as "4G." Embodiments may also be implemented using Bluetooth®, or other wireless local radio communication standards.

The present embodiments provide improved wireless communications and in particular techniques for calibrating wireless signals received by different wireless devices in a common radio environment. In various embodiments, techniques are provided that improve RSSI based localization. As detailed below, WiFi RSSI localization is facilitated by a cross-device calibration system that provides improved collection of calibration data sets and improved application of calibration techniques to the collected data. This helps reduce localization errors experienced in present RSSI localization techniques where different devices report different RSSI for the same radio signals.

By way of background, when WiFi RSSI is reported from a given wireless device with a WiFi radio in a given radio environment at a given location, the RSSI reported by the given wireless device typically spans a range of signal strength. The range of signal strength reported depends on the various WiFi transmission sources such as access points (APs) that are within a radio communications range of the given wireless device and depends upon the characteristics of the given wireless device. At a given location for a given instant in time the actual radio strength for all radio signals from all transmission sources is a fixed distribution. However because of the aforementioned "device diversity" RSSI reported from the same location at the same time may differ substantially between wireless devices.

FIGS. 1A and 1B present representative RSSI histograms collected from the same location for a smartphone type wireless device and a tablet type wireless device. As illustrated, the RSSI histogram 12 for the smartphone differs substantially from the RSSI histogram 14 for the tablet. For example, at places when the tablet reports a received average signal strength (RSSI) as −90 dBm, the average RSSI reported by the smartphone can be −95 dBm. It can also be observed that the dynamic range of two different WiFi radios is different. As illustrated in FIG. 1B the minimum and maximum RSSI reported by tablet is −96 dBm and −27 dBm, while the same sets of signals reported by the smartphone ranges from −101 dBm to −36 dBm. Moreover, the RSSI histogram 12 is much more skewed toward the range between 100 dBm to −80 dBm as compared to the histogram 14.

The calibration system of the present embodiments takes into account this device diversity shown in the different RSSI behavior presented in FIGS. 1A and 1B by generating cross-device calibration that reduces localization errors based upon RSSI techniques. Moreover, as detailed below, the present embodiments provide a scalable approach that facilitates cross-calibration of a large number of device types or models over time.

FIG. 2 depicts one example of a cross-device calibration system 100, consistent with the present embodiments. The cross-device calibration system 100 is particularly arranged to generate cross-device calibration functions that calibrate RSSI response between different device types. The term "device type" as used herein refers to a set of hardware/software components that define a device, such as WiFi radio architecture, device size and shape, antenna design, and so forth. A given "device type" if commercially successful, may be embodied in thousands or millions of like devices whose RSSI response can be expected to be the same or similar. Thus, for different wireless devices of a common device type device diversity may be expected to relatively lower. On the other hand, the RSSI response may in general be different among different device types, such as different form factor devices (smartphone vs tablet, etc.). In addition, different models of a commercial wireless device line, such as different smartphone models among a commercial vendor, may also differ among RSSI characteristics. The cross-device calibration system 100 is arranged so that cross-device RSSI calibration can be conveniently performed and used to update a system, such as an RSSI based localization system.

As illustrated, the cross-device calibration system 100 includes a cross-device RSSI calibration engine 102 that may receive RSSI calibration data sets collected for multiple different device types, such as the RSSI calibration data set A 104, RSSI calibration data set B 106, RSSI calibration data set C 108, and so forth. As described below, techniques consistent with various embodiments allow such calibration data sets to be collected in a manner that ensures more rapid and robust calibration of RSSI response between different device types.

The cross-device RSSI calibration engine 102 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

As further shown in FIG. 2, the cross-device RSSI calibration engine 102 outputs cross-device RSSI calibration functions that are based upon the received calibration data sets. For example, the cross-device RSSI calibration engine 102 may output a Device A-to-Device B RSSI Calibration Function 112 that calibrates RSSI response of Device A to that of device B, and a Device B-to-Device C RSSI Calibration Function 114 that calibrates RSSI response of Device B to that of device C. These calibration functions may be stored for subsequent use to facilitate RSSI based localization, for example, when a device corresponding to a device type of Device A or C is connected through a WiFi connection to a provider of location based services that stores pre-calibrated RSSI of Device B.

Figure 3A:
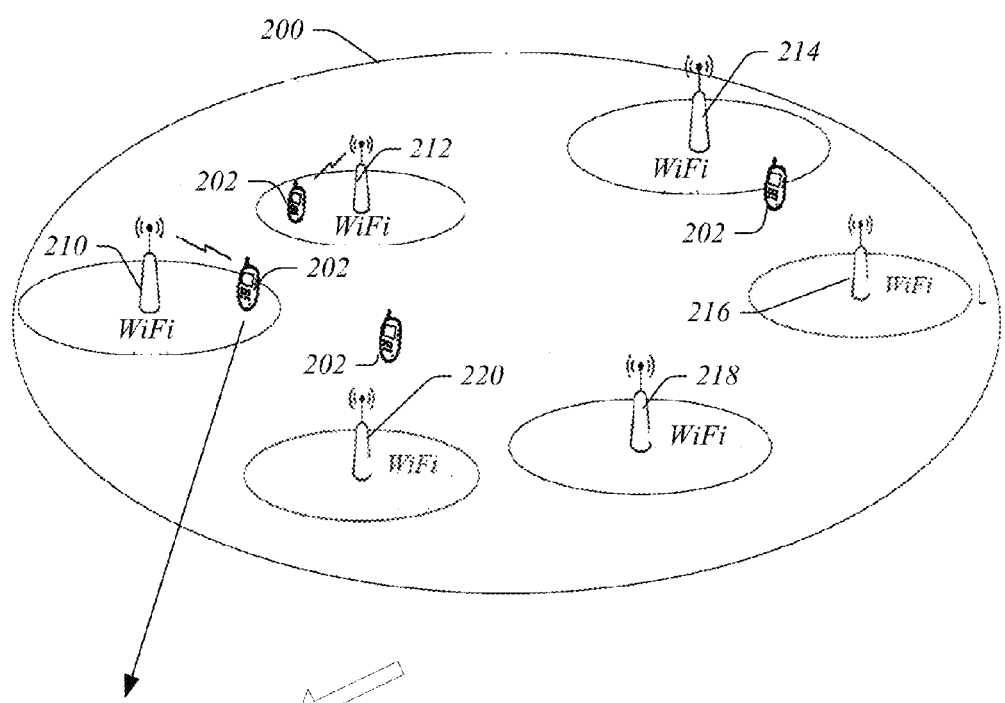
FIGS. 3A and 3B depict one exemplary implementation for determining device location.
Figure 3B:
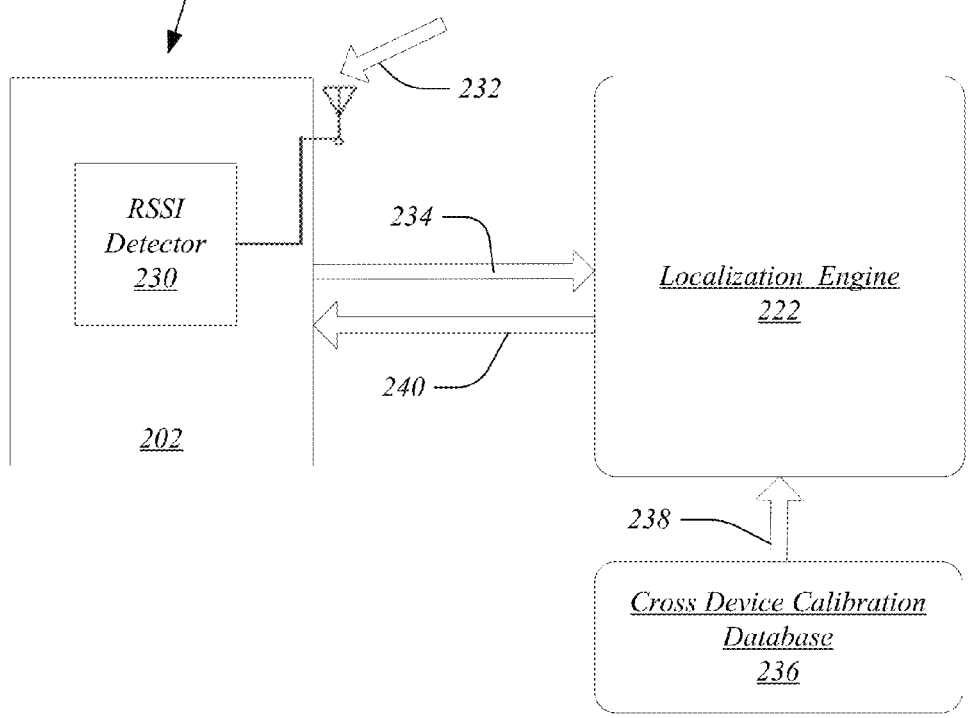

FIGS. 3A and 3B depict one exemplary implementation for determining device location. In the scenario of FIG. 3A a wireless environment 200 is generated by multiple different wireless transmission devices which are shown as WiFi access points 210, 212, 214, 216, and 218. In this environment at different instances a mobile wireless device 202 may be positioned at various locations as illustrated in FIG. 3A. In each different location the mobile wireless device 202 may perform WiFi scans and report WiFi RSSI which may include signals broadcast from any number of the WiFi access points 210-218. As the distance between the mobile wireless device 202 and the WiFi access points 210-218 changes the radio signal strength detected by the mobile device 202 may vary for each of the access points 210-218.

Turning now to FIG. 3B there are shown details of communications between the mobile wireless device 202 and a localization engine (location engine) 222, which may be a server or other device that performs various tasks including storing location database or performing location determination for mobile wireless devices. As illustrated, the mobile wireless device 202 includes an RSSI detector 230, which may include various known hardware and/or software components to determine radio signal strength such as a radio transceiver components to detect signals transmitted from the aforementioned WiFi access points 210-218. In operation, the mobile wireless device 202 may receive the radio signal(s) 232 when a series of WiFi scans are performed. RSSI information collected by the RSSI detector 230 from the radio signals 232 may be forwarded in a message 234 to a localization engine 222, which uses the RSSI information to perform WiFi RSSI based localization that determines the location of mobile wireless device 202. The localization engine 222 may be a server or other entity that is connected to a wireless node (not shown) that receives the message 234. However, in other embodiments, a localization engine, such as the localization engine 222, may reside in a mobile wireless device as detailed below.

After RSSI information in message 234 is received from the wireless mobile device 202, the localization engine 222 may determine location of the wireless mobile device based on the received RSSI information and based upon cross-device calibration information whose collection is detailed below. In one implementation cross-device calibration information is retrieved from a cross-device calibration database 236 by the localization engine 222. This cross-device calibration information may include, for example, the Device A-to-Device B RSSI Calibration Function 112, in the case that the Device B is used as the common reference device, and the wireless mobile device 202 belongs to the device Type of device A, the appropriate calibration function may be retrieved by the localization engine 222 to assist in more accurate determination of device location for wireless mobile device 202.

Figure 3C:
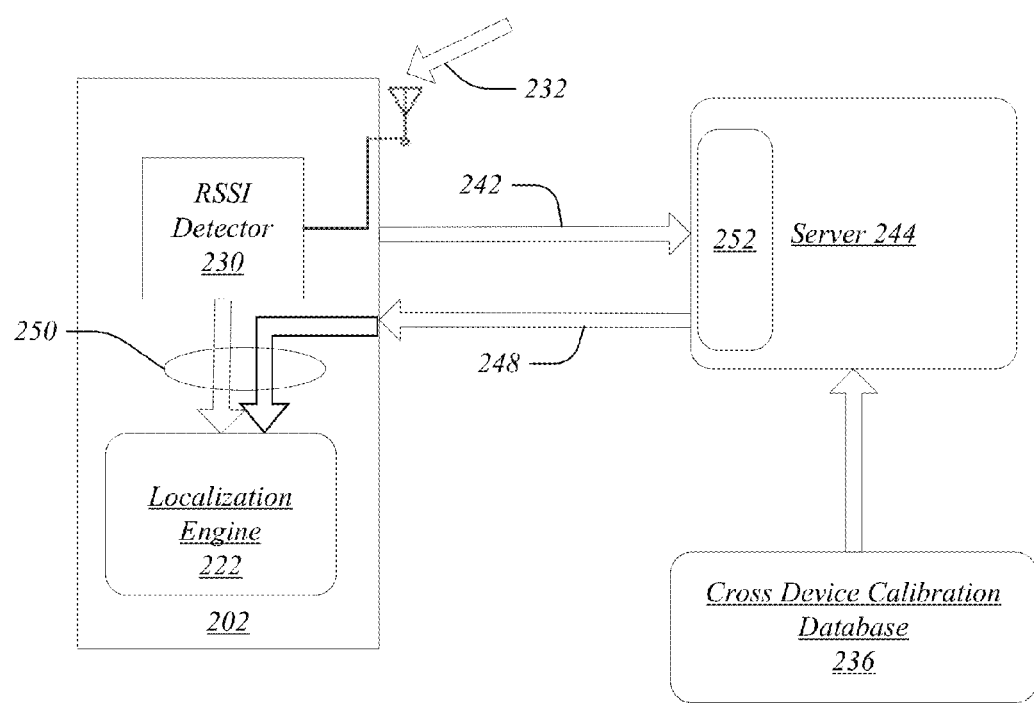
FIG. 3C together with FIG. 3A depicts another exemplary implementation for determining device location.

In one implementation, in which localization engine 222 resides in a mobile wireless device 202, the mobile wireless device 202 may send a message indicating a device type to a remote server that retrieves the appropriate cross-calibration function 236 and provides it to the mobile device 202. The mobile wireless device may then feed the RSSI and cross-device calibration function to localization engine 222 for location computation. This implementation is shown in FIG. 3C, in which the mobile device sends a request message 242 to remote server 244, which may receive the request message 242 over an interface 252. The receipt of request message 242 triggers the remote server 244 to retrieve the appropriate cross-device calibration function from cross-device calibration database 236 and send this information in message 248 to mobile wireless device 202. The appropriate cross-device calibration function information and RSSI information 250 are then fed to localization engine 222 within the mobile wireless device 202, which then uses the RSSI and cross-device calibration function to calculate location.

In order to perform the proper cross-device calibration the present embodiments provide techniques to establish a valid calibration data set for wireless devices for which cross-device calibration is to be performed. In particular, the present embodiments exhibit several features that are useful in order to have a valid calibration data set. These features are detailed below, but in brief include 1) techniques to ensure that reference signals to be measured by each wireless device (being calibrated) are the same and 2) techniques to ensure that measurement signals span a range of input signals from weak to strong over the characteristic range that each wireless device supports.

In various embodiments, measurement data is collected over a sufficiently large number of testing points to ensure that signals spanning the entire input range from weak to strong are collected. To ensure that the reference signals collected by each wireless device are statistically the same, in some embodiments all wireless devices being calibrated may collect RSSI data together at the same time at the same location. However, in other embodiments, different wireless devices may collect calibration data at different times, but the different instances of collection of calibration data are supported by techniques to select data from the same location and the same set of unchanged Access Points or WiFi transmission sources. The latter embodiments in particular offer a scalable method to allow independent calibration data collection, i.e., calibration can be done for each wireless device model as it comes to market without dependence on availability of earlier models.

Figure 4:
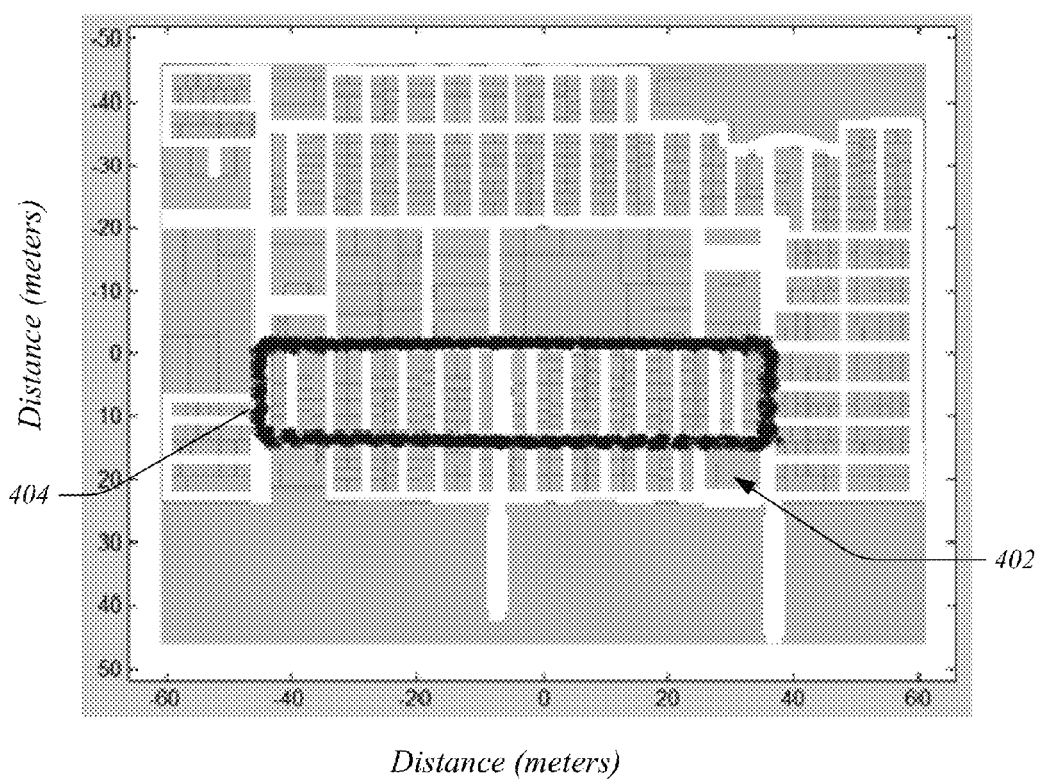
FIG. 4 depicts one arrangement for calibration of wireless devices consistent with the present embodiments.

In various embodiments, cross-device calibration is performed by performing RSSI measurement over a common calibration trajectory at a fixed calibration site. The calibration site may have multiple transmission sources or access points that are positioned at different locations. In one implementation, a one-time calibration may be performed for each newly introduced device model at the calibration site. In particular embodiments, the calibration trajectory has a closed-loop configuration and is designed to cross the coverage areas, that is, the geographical areas in which radio signals are detectable by a wireless device, of multiple access points. FIG. 4 depicts one arrangement for calibration of wireless devices consistent with the present embodiments. A closed loop calibration trajectory 404 is shown that is located within a site 402, which may be a building in which multiple access points are deployed in various locations (not shown).

To collect calibration data, the user may carry a wireless device-in-calibration and walk in natural walking style along the calibration trajectory 404 for at least two repeated loops that circumnavigate the entire calibration trajectory 404. During the calibration data collection as the user traverses the calibration trajectory WiFi scans may be performed at many different locations along the calibration trajectory 404, for example, at hundreds of measurement locations or more.

Figure 5:
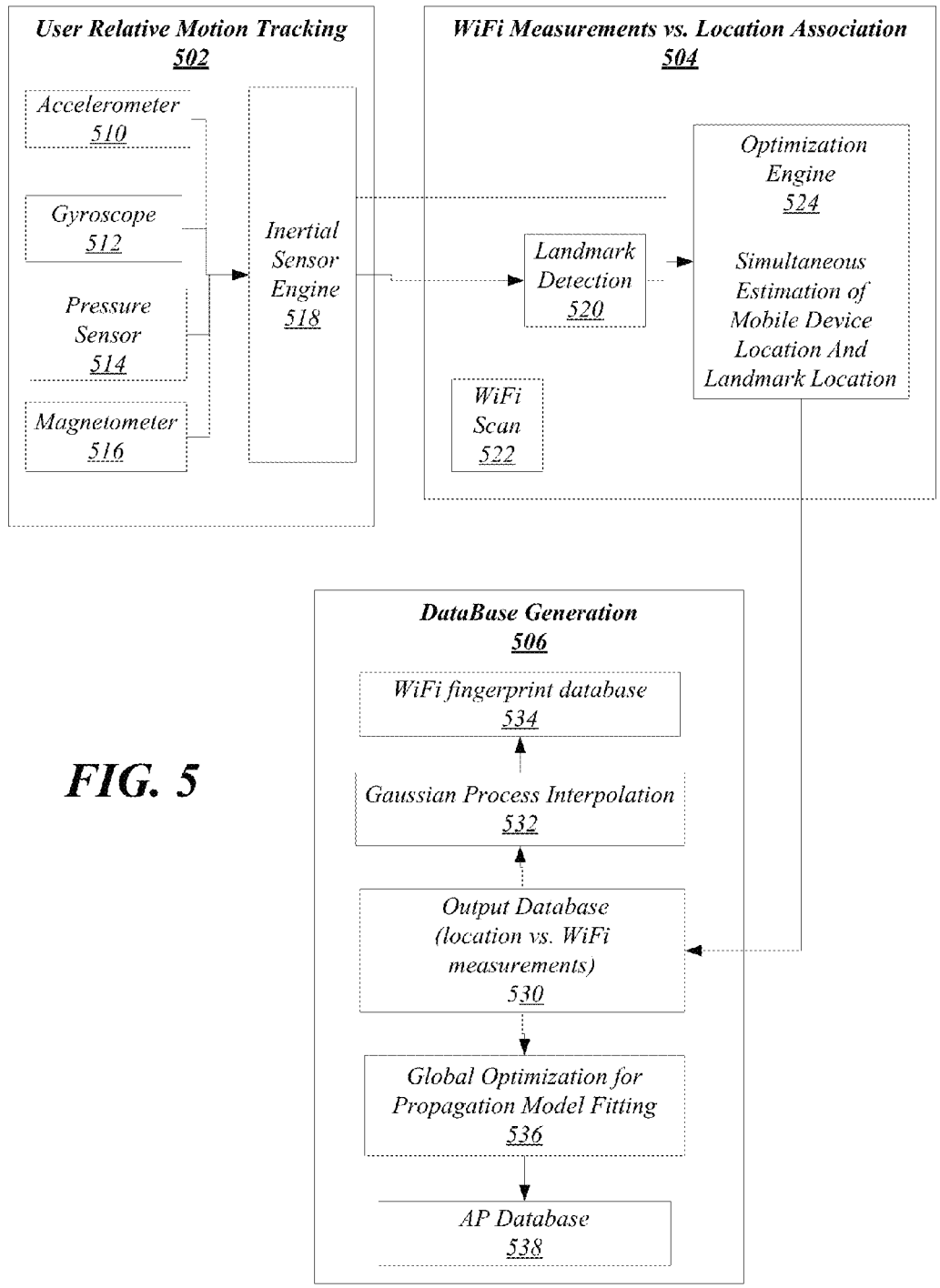
FIG. 5 presents a block diagram of components of a procedure for automatically tagging the location of calibration data.

In order to properly generate a calibration data set two different novel techniques are employed as described below. To provide a robust manner to determine measurement location, in various embodiments the location where calibration data is collected may be tagged so that the location measurements in a given set of calibration data can be stored and correlated to locations of measurements in other sets of calibration data. In various implementations, an automatic procedure is employed to tag the location of calibration data. FIG. 5 presents a block diagram of components of a procedure for automatically tagging the location of calibration data. One component involves the use of various sensor devices to provide relative user motion tracking 502. Sensor components may include an accelerometer 510, gyroscope 512, pressure sensor 514, and magnetometer 516, which may be found in many conventional mobile wireless devices. These sensor components provide sensor data that describes the motion of the wireless mobile device, which is received by an inertial sensor engine 518.

The inertial sensor engine 518 outputs sensor information for estimation of the wireless mobile device location. This is employed by the WiFi measurement vs location association component 504 to derive wireless mobile device and landmark location information. As illustrated in FIG. 5, the inertial sensor engine 518 feeds sensor information to the optimization engine 524, which performs a simultaneous estimation of wireless mobile device location and landmark location. As further shown in FIG. 5, the sensor information is output from the inertial sensor engine 518 to a landmark detection component 520. At the same time as inertial sensor data describing motion of the wireless mobile device carried by the user is collected and processed by the inertial sensor engine, the wireless mobile device performs multiple WiFi scans, which are also output to the landmark detection component 520. The optimization engine 524 receives this information, which is then used to temporally and spatially couple a given WiFi scan that provides RSSI information with a set of inertial sensor and landmark information that identifies the location of the wireless mobile device at the time of the given WiFi scan.

When the user performs a calibration data collection by "walking" a wireless mobile device through a calibration trajectory, the optimization engine 524 may output the results for storage in a database. In the example of FIG. 5, an output database 530 stores the device location vs WiFi measurement information generated by the optimization engine 524. The output data base may further distribute this information to a component 532, which performs a Gaussian Process Interpolation and outputs the results to a WiFi fingerprint database 534. The output database 530 may also distribute the device location vs WiFi measurement information to a component 536 that performs global optimization for propagation model fitting, and outputs the result to an access point (AP) database 538.

FIG. 6 depicts an exemplary data structure 600 that may be output from the optimization engine 524. The data structure 600 contains a calibration data set that contains n entries 602A-602N as shown in FIG. 6. Each entry comprises K measurements corresponding to WiFi RSSI (receiving signal strength) measured by a wireless mobile device for signals transmitted from K Access Points. Each entry further includes the location (x, y) where the WiFi RSSI scan was made. Thus, a first entry for a WiFi RSSI scan has the location denoted $x_1$, $y_1$ and associated RSSI measurements, $RSSI_{1(1)}$, $RSSI_{1(2)}$, and $RSSI_{1(k)}$ for respective access point 1, access point 2, and access point k. Similarly, a second entry for a WiFi RSSI scan at the location denoted $x_2$, $y_2$ has the associated RSSI measurements, $RSSI_{2(1)}$, $RSSI_{2(2)}$, and $RSSI_{2(k)}$ for respective access point 1, access point 2, and access point k.

An advantage of the automatic tagging of wireless device location for WiFi scans provided by the present embodiments is the drastic reduction in collection time for calibration data compared with conventional manual tagging of device location. For example, in one instance about ~1100 WiFi scanning results at ~300 locations may be obtained within one hour. On the other hand, if relying on a manual data collection method, more than five hours may be needed to collect the same amount of calibration data.

In additional embodiments, techniques are provided to ensure that cross-device calibration between a first and second wireless device can be properly accomplished when calibration data is collected over a common calibration trajectory at a first instance for the first wireless device and at a later instance for the second wireless device. In particular, WiFi measurements resulting from changed access points (APs) may be filtered out when either the transmission power of an access point changes or a change in access point locations takes place. This allows a determination to be made as to whether reported differences in WiFi measurement statistics between a first device and second device are due to differences in device characteristics or differences in APs between the time of collection of the first calibration data set and that of the second calibration data set.

In one implementation to perform cross-device calibration, techniques are provided to make sure that measurement signals recorded from different calibration data collections are from the same set of unchanged APs. To that end, a common set of APs is identified from two calibration data sets, such as two sets Γ1 and Γ2. This may be based upon the identified media access control (MAC) addresses. Subsequently possible changes at those common APs are identified, and measurements associated with changed APs excluded. More specifically, let $RSSI^{\Gamma 1}(i)$ and $RSSI^{\Gamma 2}(i)$ be the set of measurements for the $i_{th}$ access point across all calibration data points (i=1, 2, ..., K) in data sets Γ1 and Γ2 respectively. We have $u^{\Gamma 1}(i)=\text{mean}\{RSSI^{\Gamma 1}(i)\}$ and $u^{\Gamma 2}(i)=\text{mean}\{RSSI^{\Gamma 2}(i)\}$. In this approach, an AP, such as k, is determined to have changed when the following condition is satisfied:

$$u^{\Gamma 1}(k)-u^{\Gamma 2}(k)>\text{Median}\{u^{\Gamma 1}(i)-u^{\Gamma 2}(i), i=1,2,\ldots,K\}\pm \text{threshold} \quad \text{Eq. (1)},$$

where Median{ } is the median average of the data set. In other words, for an unchanged access point such as j, the difference $u^{\Gamma 1}(j)-u^{\Gamma 2}(j)$ is mainly due to device differences between a first wireless device and second wireless device. In this manner, the difference $u^{\Gamma 1}(j)-u^{\Gamma 2}(j)$ roughly captures device diversity between the first and second wireless device, and the differences in RSSI should be roughly the same for all unchanged access points. Therefore, given the assumption that the majority of access points stay unchanged, the entity Median$\{u^{\Gamma 1}(i)-u^{\Gamma 2}(i), i=1, 2, \ldots, K\}$ represents measurement RSSI differences caused by wireless device differences. If $u^{\Gamma 1}(k)-u^{\Gamma 2}(k)$ is significantly larger or smaller (beyond±threshold) than the value, then the access point k is deemed to have changed. As a result, all measurements associated with the access point k are excluded from the calibration data set.

Consistent with various embodiments, once valid calibration data sets are determined in accordance with the aforementioned calibration data collection processes, the valid calibration data sets may be processed by one of several different calibration methods to perform cross-device calibration for the wireless devices of interest. In some embodiments a cross-calibration function is generated that reduces differences between a first RSSI data set and a second RSSI data set. In particular embodiments, the cross-calibration function minimizes differences between a first RSSI data set and a second RSSI data set. As detailed below, in particular embodiments a least square calibration method, a Chi square calibration method, a Gaussian reshape calibration method, or a Max/Min reshape calibration method is performed to cross-calibrate RSSI response from different wireless devices.

Least Squares Calibration.

In the least square calibration method, RSSI measurements for each entry of two data sets Γ1 and Γ2 are matched, such that the sum S of the squared WiFi distance is a minimum. The WiFi distance is defined as the distance of relevant WiFi measurements at the corresponding entries of the two data sets Γ1 and Γ2. More specifically, in this embodiment, it may be postulated that the entry A in Γ1 has location $(X_a, Y_a)$ and $RSSI_A(i)$, entry B in Γ2 has location $(X_b, Y_b)$ and $RSSI_B(i)$, where i=1, 2, ..., K, where K is the number of access points that may be detected by the wireless mobile devices. Also let $[RSSI_{min}, RSSI_{max}]$ be the defined valid RSSI range. Consistent with this embodiment, entry A and entry B are deemed to be corresponding entries of Γ1 and Γ2 if the following condition is met:

$$\text{sqrt}((X_a-X_b)^2+(Y_a-Y_b)^2)<\gamma \quad \text{Eq. (2)},$$

where γ is chosen such that there is only one to one correspondence between corresponding entries.

When entries A and B are determined to be corresponding entries, the relevant WiFi measurements at entries A and B are determined by the following condition: Only if RSSI measurements of a common access point at both entry A and entry B fall within the valid range $[RSSI_{min}, RSSI_{max}]$, then those two WiFi measurements are considered as relevant WiFi measurements. That is, $$RSSI_A(i) = \begin{cases} RSSI_A(i), & \text{if } RSSI_A(i) \in [RSSI_{min}, RSSI_{max}] \text{ AND} \\ & RSSI_B(i) \in [RSSI_{min}, RSSI_{max}] \\ 0, & \text{otherwise;} \end{cases} \quad \text{Eq. (3)}$$

$$RSSI_B(i) = \begin{cases} RSSI_B(i), & \text{if } RSSI_A(i) \in [RSSI_{min}, RSSI_{max}] \text{ AND} \\ & RSSI_B(i) \in [RSSI_{min}, RSSI_{max}] \quad ; \\ 0, & \text{\&otherwise;} \end{cases}$$

where $i = 1, 2, \ldots, K$.

Given the calibration function f(·) from $RSSI_B$ to $RSSI_A$, the WiFi distance r is calculated as:

$$r=\|RSSI_A f(RSSI_B)\| \quad \text{Eq. (4)},$$

where ∥·∥ is the norm function. Examples for the distance calculation include Euclidean distance (2 norm), or Manhattan distance (1 norm).

The calibration function f(·) is determined such that the sum of the squared WiFi distance over all entries of Γ1 and Γ2 is minimized. The calibration function f'(·) from $RSSI_A$ to $RSSI_B$ may be determined in a similar manner.

Chi Square Calibration

Using Chi Square Error minimization, the RSSI distribution of two data set Γ1 and Γ2 are matched such that the Chi-Square Statistics is minimized. Similarly to the least squares calibration discussed above, an initial procedure for performing calibration in this embodiment is the determination of relevant WiFi measurements at the corresponding entries of the two data sets Γ1 and Γ2 in accordance with the procedures set forth in equations (2) and (3).

A subsequent procedure involves, for each non-zero RSSI value in Γ1 resulting from application of equations (2) and (3), an insertion of the RSSI value into a RSSI data set Ω1, where Ω1 has no particular order and contains all relevant WiFi RSSI measurements for all entries of Γ1 (repeated RSSI values are allowed). In the similar manner, an RSSI data set Ω2 is also constructed for data set Γ2.

Using a given RSSI data set Ω2 a data set Ω2' is constructed by applying the calibration function $f(\cdot)$ to each element RSSI in Ω2. The range of $[RSSI_{min}, RSSI_{max}]$ may be divided into B bins given a bin size $RSSI_{bin}$, where $$B = \text{ceil}\left(\frac{RSSI_{max} - RSSI_{min}}{RSSI_{bin}}\right). \quad \text{Eq. (5)}$$

Let $N_i$ may be designated as the number of RSSI values in bin i for the data set Ω1, and $M_i$ the number of RSSI values in the same bin i for the data set Ω2'. The chi square statistic may then be determined as $$X^2 = \sum_i^B \frac{(N_i - M_i)^2}{N_i + M_i}. \quad \text{Eq. (6)}$$

The calibration function $f(\cdot)$ is determined such that the chi-square statistics are minimized. In a similar manner the calibration function $f'(\cdot)$ from $RSSI_A$ to $RSSI_B$ may be determined.

Gaussian Reshape Calibration:

In embodiments that employ a Gaussian reshape calibration, a fitted Gaussian distribution is matched for the two data sets Γ1 and Γ2. Similarly to embodiments that employ the Chi-square statistics calibration procedure, the initial procedures of the Chi-square calibration are used to obtain RSSI data set Ω1 and Ω2 for the two data sets Γ1 and Γ2. Using Gaussian fitting, the mean ($u_1$) and standard deviation ($\sigma_1$) for Ω1 are obtained, as well as mean ($u_2$) and standard deviation ($\sigma_2$) for Ω2.

Assuming a linear calibration model f(x)=ax+b, to translate the RSSI value of device 2 to device 1, the following procedure is adopted:

$$a = \frac{\sigma_1}{\sigma_2}, b = u_1 - au_2. \quad \text{Eq. (7)}$$

Similarly, to translate the RSSI value of device 1 to device 2, given the linear calibration function f'(x)=a'x+b', $$a' = \frac{\sigma_2}{\sigma_1}, b' = u_2 - au_1. \quad \text{Eq. (8)}$$

Max/Min Reshape Calibration:

In various additional embodiments, a maximum/minimum (Max/min) reshape calibration procedure is applied in a manner similar to Gaussian reshape procedure discussed above, with a difference being that no Gaussian distribution is assumed. One impetus for using the Max/min reshape calibration procedure to cross-calibrate different wireless devices is based upon the observation that the different RSSI readings from two different devices are typically due in large part to different dynamic range of different WiFi transceivers, as well as different RSSI offsets caused by differences in transceiver calibration, antenna placement, etc. Therefore, a reason to employ Max/min reshape calibration procedure is to ensure RSSI readings from two different devices have the same minimum-to-maximum (min-to-max) range and the same RSSI offset through linear transformation.

In this embodiment, similarly to the Chi-square statistics calibration method, the RSSI data set Ω1 and Ω2 is constructed from Γ1 and Γ2, with a difference lying in the fact that $[RSSI_{min}, RSSI_{max}]$ range is not applied. It may be postulated that $X1_{max}$ and $X1_{min}$ are the max and min RSSI value in Ω1, u1 the mean RSSI value of Ω1, $X2_{max}$ and $X2_{min}$ the max and min RSSI value in Ω2, and u2 the mean RSSI value of Ω2. Given the linear translation model f(x)=ax+b. To translate RSSI value of device 2 to device 1, the following procedure applies:

$$a = \frac{X1_{max} - X1_{min}}{X2_{max} - X2_{min}}, b = u_1 - au_2. \quad \text{Eq. (9)}$$

Similarly, to translate RSSI value of device 1 to device 2, given the function f'(x)=a'x+b', $$a' = \frac{X2_{max} - X2_{min}}{X1_{max} - X1_{min}}, b' = u_2 - au_1. \quad \text{Eq. (10)}$$

Figure 7:
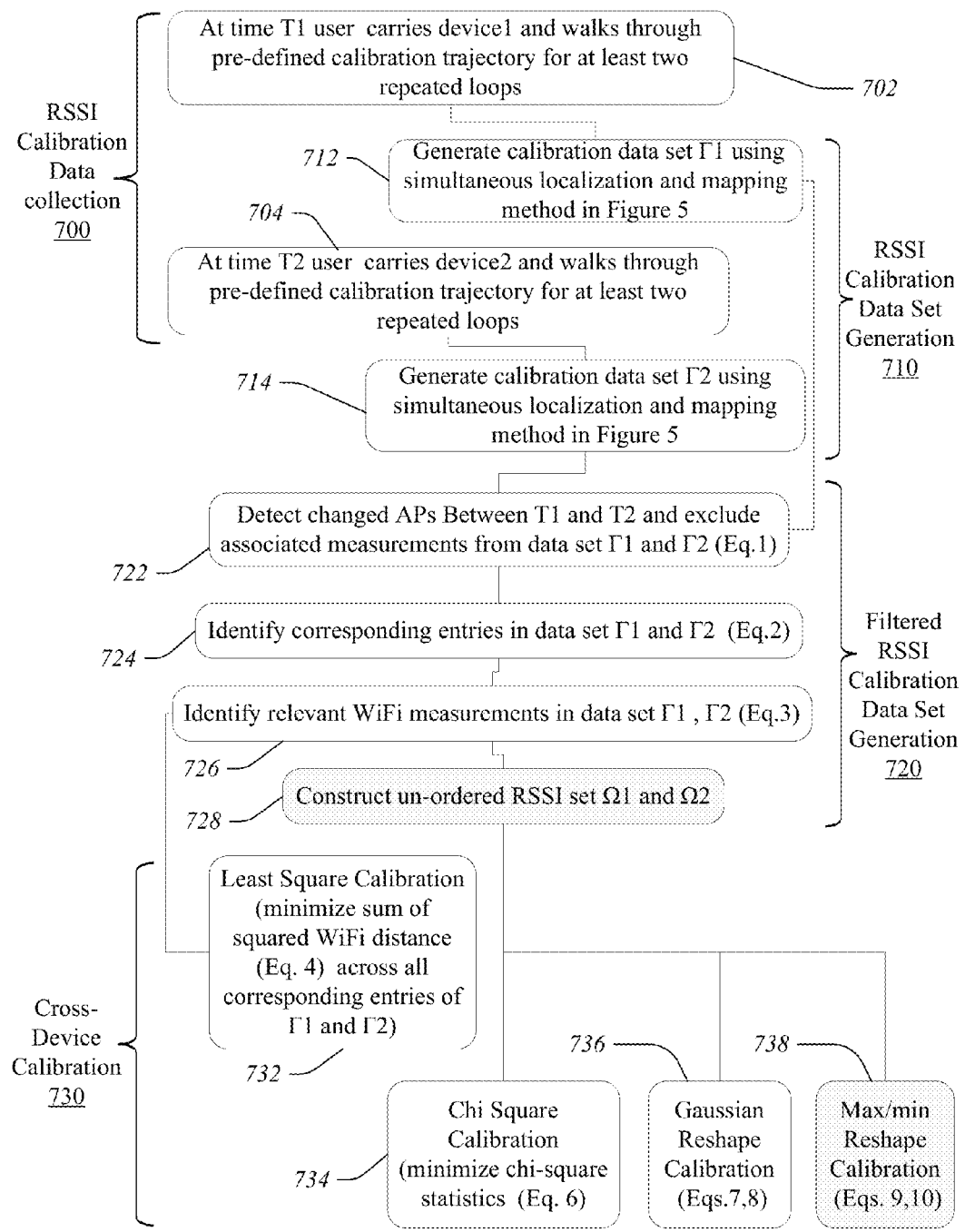
FIG. 7 provides a global view of different components for generation of cross-device RSSI calibration.

FIG. 7 provides a global view of different components for generation of cross-device RSSI calibration. As illustrated a first component is RSSI calibration data collection 700, followed by RSSI calibration data set generation 710, filtered RSSI calibration data set generation 720, and cross-device calibration 730. As depicted in FIG. 7, in one scenario the RSSI calibration data set generation 710 involves the procedure 712 where at a time T1 a user carries a first wireless device (device1) while walking through a pre-defined calibration trajectory for at least two loops of the trajectory. However in other implementations, the user may walk through a single loop of the pre-defined calibration trajectory. The RSSI calibration data set generation 710 further involves the procedure 714 where at a time T2 a user, which may be the same or different user, carries a second wireless device (device2) while walking through the same pre-defined calibration trajectory for at least two loops of the trajectory. However in other implementation, the user may walk through a single loop of the pre-defined calibration trajectory. The time elapsed between T1 and T2 may be minutes, hours, days, months, or longer.

As further illustrated in FIG. 7, after each collection of RSSI calibration data, a corresponding RSSI calibration data set generation procedure is performed. For example, in conjunction with the calibration data collected by device1 (702) the simultaneous localization and mapping method described in FIG. 5 (712) may be performed to generate a calibration data set Γ1 as generally described above. Similarly, in conjunction with the calibration data collected by device2 (704) the simultaneous localization and mapping method described in FIG. 5 (714) may be performed to generate a calibration data set Γ2.

Following the example of FIG. 7, a filtered RSSI calibration data set is generated from the two calibration data sets Γ1 and Γ2 as also described above. The filtered data set accounts, for example, for changes that may take place in the access point WiFi configuration between the times T1 and T2. In particular, the procedure 722 is performed to detect changed access points (APs) between time T1 and T2 and to exclude associated measurements from calibration data sets Γ1 and Γ2 according to Eq (1) above. Subsequently, the procedure 724 is performed to identify corresponding entries from calibration data sets Γ1 and Γ2, where entries are deemed to be "corresponding" when the measurement from the first calibration data set and second calibration data set are taken within a physical location proximity of one another in accordance with Eq. (2) above.

Subsequently, the procedure 726 is performed to identify relevant WiFi measurements from calibration data sets Γ1 and Γ2 according to Eq (3) above. In addition, the procedure 728 may be performed to construct an unordered RSSI set Ω1 and Ω2 as described above.

Once a filtered RSSI calibration data set is generated, a cross-device calibration procedure is applied, which may entail one of several different calibration procedures, four of which are illustrated in FIG. 7. These include least square calibration procedure 732, Chi squared calibration procedure 734, Gaussian reshape calibration 736, and Max/min Reshape Calibration 738. Depending upon the calibration procedure selected, the procedure 728 may or may not be applied as shown in FIG. 7. Consistent with the present embodiments, depending upon the characteristics of WiFi access points, different wireless devices to be calibrated, and other factors, one or other of the calibration procedures may be most effective in cross-calibration of devices for RSSI response. For example, two devices may be determined to have a large difference in dynamic range of WiFi transceivers. Accordingly, in the scenario suggested by the shading in FIG. 7, the procedure 728 is performed to construct an unordered RSSI set Ω1 and Ω2 as a preface to performing a Max/min reshape calibration 738.

In an experimental implementation, cross-device calibration was performed between a smartphone device and tablet device using the procedure generally shown in FIG. 7 for each of the four calibration methods shown therein. Subsequently, using a WiFi based fingerprint database for the tablet device, the location of the smartphone was estimated. FIG. 8 depicts results of resulting location accuracy determined from 329 test points for the different calibration procedures of the present embodiments, as well as location accuracy when no cross-device calibration is performed between the tablet and smartphone device. Thus, in the latter scenario, the tablet device WiFi fingerprint database alone is used to estimate the actual location of the smartphone device. As can be seen, due to the "device diversity," a relatively large location error of about 12 m on average is found, with a maximum error of about 55.5 m. In contrast, for all of the calibration procedures in accordance with the present embodiments, an average location error ranges between about 2-3 m, and maximum location error is much less than that observed without cross-device RSSI calibration.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 9:
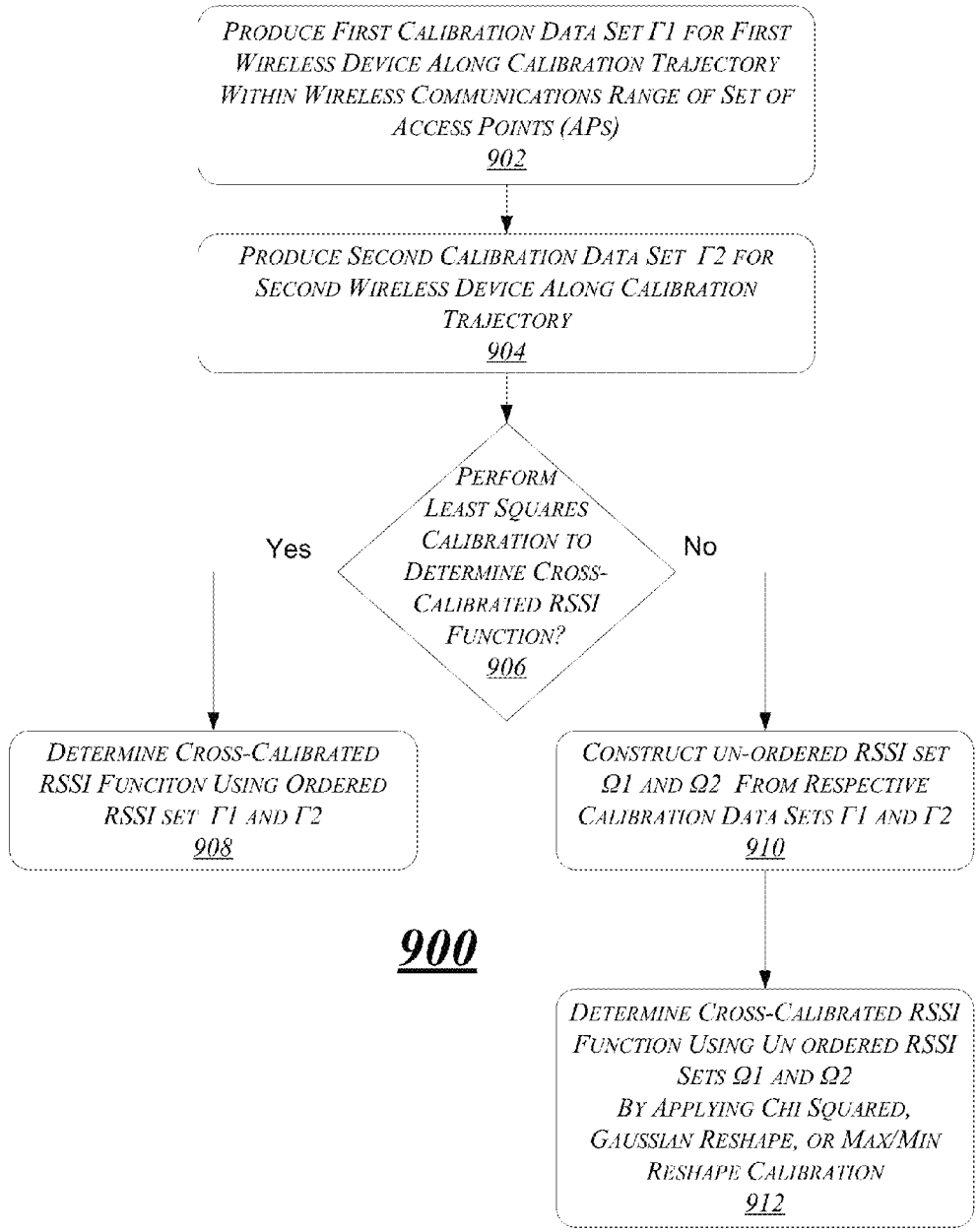
FIG. 9 depicts an exemplary first logic flow.

FIG. 9 illustrates an exemplary first logic flow 900. At block 902, a first calibration data set is produced for a first wireless device along a calibration trajectory within wireless communications range of a set of access points. The calibration data set may be produced by using the simultaneous localization and mapping method described in FIG. 5.

At block 904 a second calibration data set Γ2 is generated for a second wireless device along the same calibration trajectory as that of the first wireless device. The second calibration data set Γ2 may be generated at any instance later than that of the first calibration data set Γ1.

At block 906 a decision is made as to whether a least squares calibration is to be performed to calibrate the RSSI response of the first wireless device to the second wireless device. If so, the flow moves to block 908 where a cross-device calibration is performed using the ordered first and second calibration data sets Γ1 and Γ2.

If, at block 908, calibration is to be performed by another procedure, the flow moves to block 910. At the block 910 an un-ordered RSSI set Ω1 and Ω2 are constructed from respective calibration data sets Γ1 and Γ2.

The flow then proceeds to block 912 where a Cross-device Calibrated RSSI Function is determined using a set of un-ordered RSSI Sets Ω1 and Ω2 by applying one of Chi Squared, Gaussian Reshape, or Max/Min Reshape Calibration procedures.

Figure 10:
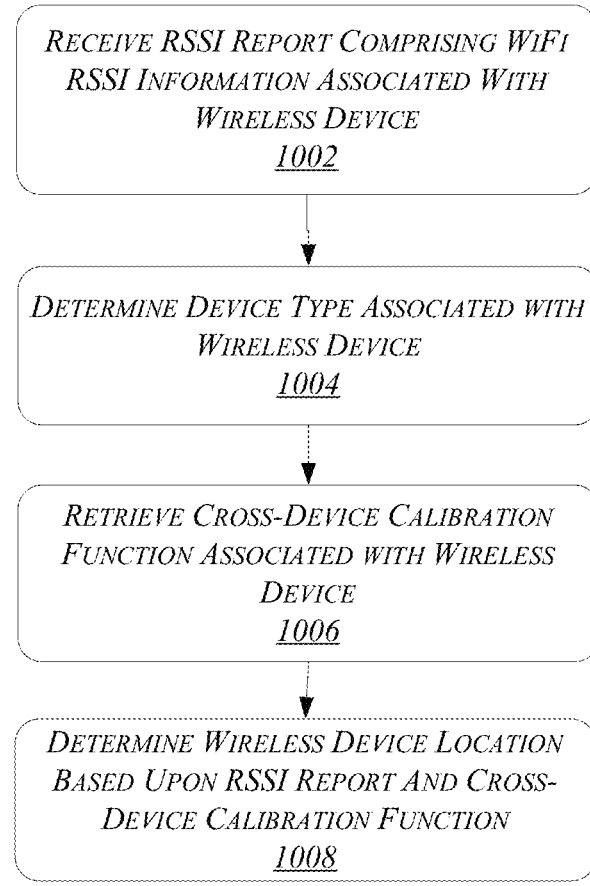
FIG. 10 depicts an exemplary second logic flow.

FIG. 10 illustrates an exemplary second logic flow 1000. At block 1002 a RSSI Report comprising WiFi RSSI information associated with a wireless device is received. At block 1004 a determination is made as to the device type associated with the wireless device is made. At block 1006 a cross-device calibration function is retrieved that is associated with the device type of the wireless device. At block 1008 the location of the wireless device is determined based upon the RSSI Report and the retrieved cross-device calibration function.

Figure 11:
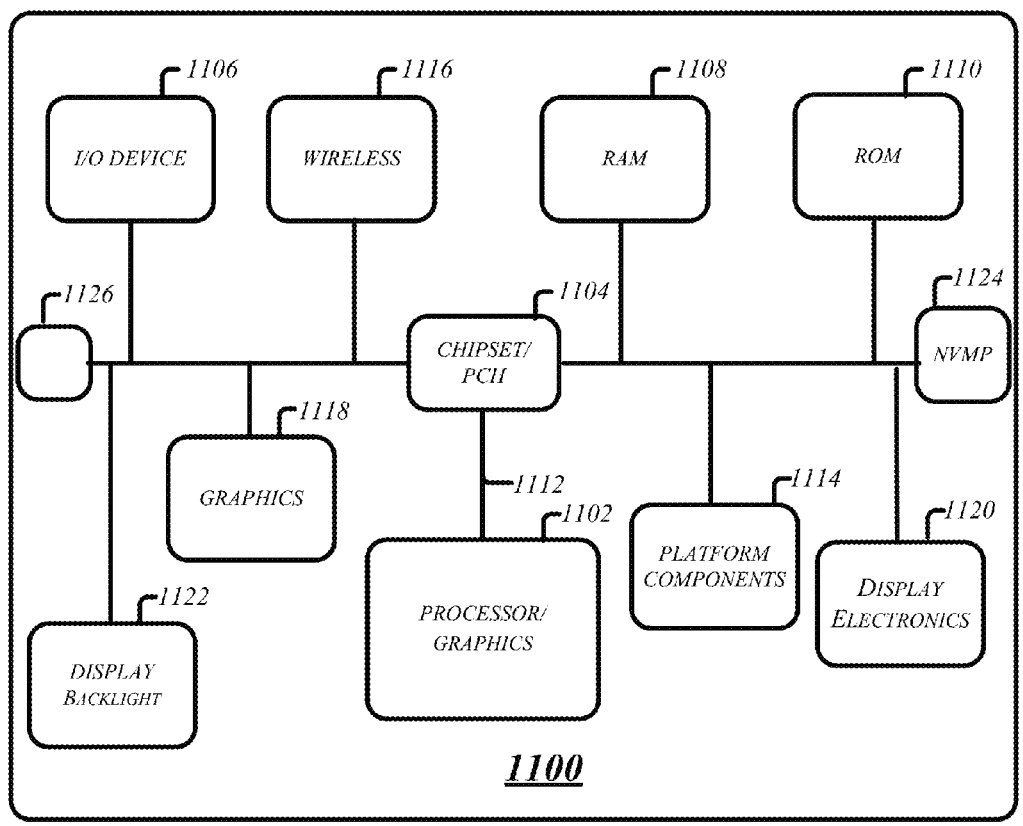
FIG. 11 illustrates one embodiment of a computing system.

FIG. 11 is a diagram of an exemplary system embodiment and in particular, FIG. 11 is a diagram showing a platform 1100, which may include various elements. For instance, FIG. 11 shows that platform (system) 1110 may include a processor/graphics core 1102, a chipset/platform control hub (PCH) 1104, an input/output (I/O) device 1106, a random access memory (RAM) (such as dynamic RAM (DRAM)) 1108, and a read only memory (ROM) 1110, display electronics 1120, display backlight 1122, and various other platform components 1114 (e.g., a fan, a crossflow blower, a heat sink, DTM system, cooling system, housing, vents, and so forth). System 1100 may also include wireless communications chip 616 and graphics device 1118. The embodiments, however, are not limited to these elements.

As shown in FIG. 11, I/O device 1106, RAM 1108, and ROM 1110 are coupled to processor 1102 by way of chipset 1104. Chipset 1104 may be coupled to processor 1102 by a bus 1112. Accordingly, bus 1112 may include multiple lines.

Processor 1102 may be a central processing unit comprising one or more processor cores and may include any number of processors having any number of processor cores. The processor 1102 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 1102 may be multiple separate processors located on separate integrated circuit chips. In some embodiments processor 1102 may be a processor having integrated graphics, while in other embodiments processor 1102 may be a graphics core or cores.

Figure 12:
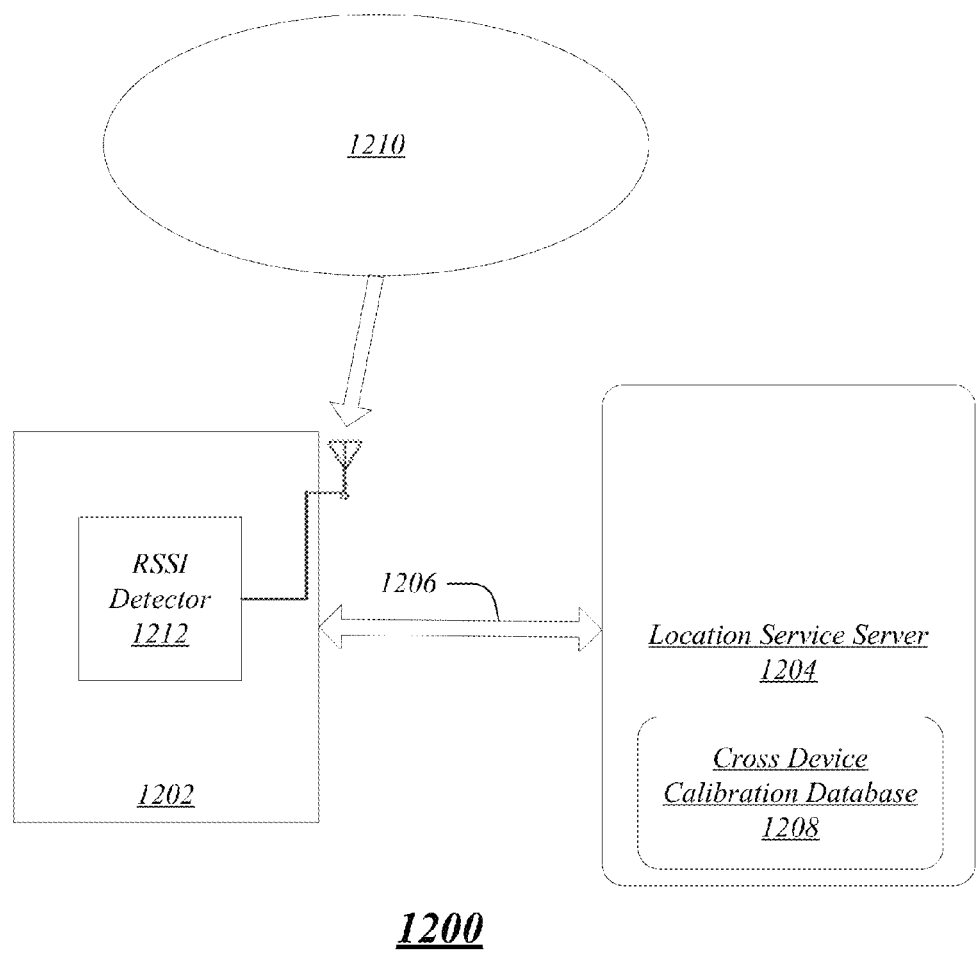
FIG. 12 illustrates one embodiment of a communications architecture.

FIG. 12 depicts an exemplary communications architecture 1200. A mobile wireless device 1202 is communicatively coupled over the link 1206 to a location service server 1204. The link 1206 may be any combination of wireless and wired links. The location service server 1204 may maintain cross-device calibration functions in a cross-device calibration database 1208. When a device such as the mobile wireless device 1202 is proximate or immersed within a radio environment 1210, an RSSI detector 1212 may detect RSSI information. This information may be used by the mobile wireless device 1202 or forwarded to the location service server 1204 to aid in location determination of the wireless mobile device 1202. The location service server 1204 may determine the device type of the mobile wireless device 1202, and determine then further communicate with the appropriate cross-device calibration function for determining device location of the mobile wireless device 1202 based on its device type. This cross-device calibration function may be forwarded to the mobile wireless device 1202 so that the mobile wireless device 1202 may perform its own location determination in some implementations. In other implementations, the location service server or other entity may employ the cross-device calibration function pertaining to mobile wireless device 1202 and the reported RSSI information from mobile wireless device 1202 to determine its location, which location information may then be reported to the mobile wireless device 1202.

The following examples pertain to further embodiments.

Example 1 is an apparatus for cross-device calibration that includes a memory to store a first radio signal strength indicator (RSSI) data set comprising first data entries for RSSI detected from a multiplicity of transmission sources by a first wireless device of a first device type, and to store a second RSSI data set comprising second data entries for RSSI detected from the multiplicity of transmission sources by a second wireless device of a second device type. The apparatus also includes a cross-device radio calibration engine to receive the first RSSI data set and second RSSI data set and generate a cross-calibrated RSSI function comprising a function that reduces differences between the first RSSI data set and the second RSSI data set.

In example 2 the first device type of example 1 may differ from the second device type in transceiver design, antenna placement, and/or radio calibration.

In example 3, the first data entries of any of the examples 1-2 may include WiFi RSSI data detected at a first instance by the first wireless device at a first set of locations from a multiplicity of WiFi access points and the second data entries may include WiFi RSSI data detected at a second instance by the second wireless device at a second set of locations from the multiplicity of WiFi access points.

In example 4, the cross-device radio calibration engine of any of the examples 1-3 may optionally filter out WiFi measurements resulting from WiFi access points whose transmission power or location has changed between the first and second instance.

In example 5, the first RSSI data set of any of the examples 1-4 may include a first set of location tags that identify the first set of locations and corresponding WiFi RSSI reports and the second RSSI data set may include a second set of location tags that identify the second set of locations and corresponding WiFi RSSI reports.

In example 6, the first and second set of location tags of any of the examples 1-5 may include be determined by simultaneous localization and mapping using inertial sensor measurement and/or virtual landmark detections.

In example 7, the first and second set of location tags of any of the examples 1-6 may be disposed along a common measurement trajectory.

In example 8, the first RSSI data set and second RSSI data set of any of the examples 1-7 may each include RSSI data that spans a range of at least −30 dBm to −100 dBm.

In example 9, the cross-calibrated RSSI function of any of the examples 1-8 may comprise a function derived from a least squares calibration, a Chi squared calibration, a Gaussian reshape calibration, or a Max/min reshape calibration.

In example 10, the cross-calibrated RSSI function of any of the examples 1-9 may comprise a function that minimizes differences between the first RSSI data set and the second RSSI data set.

In example 11, at least one computer-readable storage medium includes instructions that, when executed, cause a system to receive a first radio signal strength indicator (RSSI) data set comprising data detected from a multiplicity of transmission sources by a first wireless device of a first device type, to receive a second RSSI data set comprising data detected from the multiplicity of transmission sources by a second wireless device of a second device type, and to generate a cross-calibrated RSSI function comprising a function that reduces differences between the first RSSI data set and the second RSSI data set.

In example 12, the first RSSI data set of example 11 may comprise WiFi RSSI data detected by the first wireless device at a first set of locations from a multiplicity of WiFi transmission sources and the second RSSI data may comprise WiFi RSSI data detected by the second wireless device at a second set of locations from the multiplicity of WiFi transmission sources.

In example 13, the first RSSI data set of any of the examples 11-12 may include a first set of location tags that identify the first set of locations and corresponding WiFi RSSI reports and the second RSSI data set may include a second set of location tags that identify the second set of locations and the corresponding WiFi RSSI reports, the first and second set of location tags being determined by simultaneous localization and mapping method using inertial sensor measurement and/or virtual landmark detection.

In example 14, the first set of locations and second set of locations of any of the examples 11-13 may be disposed along a common measurement trajectory.

In example 15, the at least one computer-readable storage medium of any of examples 11-14 may include instructions that, when executed, cause a system to generated the cross-calibrated RSSI function by performing, using the first and second RSSI data sets, a least squares calibration, a Chi squared calibration, a Gaussian reshape calibration, or a Max/min reshape calibration.

In example 16, the cross-calibrated RSSI function of any of the examples 11-15 may comprise a function that minimizes differences between the first RSSI data set and the second RSSI data set.

In example 17, a method of cross-device calibration includes receiving a first radio signal strength indicator (RSSI) data set comprising data detected at a first instance from a multiplicity of transmission sources by a first wireless device of a first device type, receiving a second RSSI data set comprising data detected at a second instance from the multiplicity of transmission sources by a second wireless device of a second device type; and generating a cross-calibrated RSSI function comprising a function that reduces differences between the first RSSI data set and the second RSSI data set.

In example 18, the first RSSI data set of example 17 may include WiFi RSSI data detected by the first wireless device at a first set of locations from a multiplicity of WiFi access points and the second RSSI data set may include WiFi RSSI data detected by the second wireless device at a second set of locations from the multiplicity of WiFi access points.

In example 19, the first RSSI data set of any of the examples 17-18 may include a first set of location tags that identify the first set of locations and corresponding WiFi RSSI reports and second RSSI data set may include a second set of location tags that identify the second set of locations and corresponding WiFi RSSI reports, the first and second set of location tags determined by the simultaneous localization and mapping method using inertial sensor measurement and/or virtual landmark detection.

In example 20, the first set of locations and second set of locations of any of the examples 17-19 may be disposed along a common measurement trajectory.

In example 21, the method of any of examples 17-20 may include generating the first and second RSSI data set by filtering out WiFi measurements resulting from WiFi access points whose transmission power or location has changed between the first and second instance.

In example 22, the method of any of examples 17-21 may include generating the cross-calibrated RSSI function by performing, using the first and second RSSI data sets, a least squares calibration, a Chi squared calibration, a Gaussian reshape calibration, or a Max/min reshape calibration.

In example 23, the cross-calibrated RSSI function of any of examples 17-22 may include a function that minimizes differences between the first RSSI data set and the second RSSI data set.

In example 24, a system includes an interface to receive received signal strength indicator (RSSI) data for a first wireless device of a first device type; and a location engine to receive a cross-calibrated RSSI function for the first device type, the cross-calibrated RSSI function comprising a function that reduces differences between a respective first RSSI data set detected from a multiplicity of transmitting devices by the first wireless device and a second RSSI data set detected from the multiplicity of transmitting devices by a second wireless device of a second device type, and to determine device location of the first wireless device based upon the received RSSI data and received cross-calibrated RSSI function.

In example 25, the first RSSI data set of example 24 may include WiFi RSSI data detected by the first wireless device at a first set of locations from a multiplicity of WiFi access points, and the second RSSI data set comprising WiFi RSSI data detected by the second wireless device at a second set of locations from the multiplicity of WiFi access points.

In example 26, the first RSSI data set of any of examples 24-25 may include a first set of location tags that identify the first set of locations and corresponding WiFi RSSI reports, and second the RSSI data set may include a second set of location tags that identify the second set of locations and corresponding WiFi RSSI reports.

In example 27, the first and second set of location tags of any of examples 24-26 may be determined by simultaneous localization and mapping using inertial sensor measurement and/or virtual landmark detection, and the first set of locations and second set of locations may be disposed along a common measurement trajectory.

In example 28, the retrieved cross-calibrated RSSI function comprising a function of any of the examples 24-27 may be derived from a least squares calibration, a Chi squared calibration, a Gaussian reshape calibration, or a Max/min reshape calibration.

In example 29, the cross-calibrated RSSI function of any of examples 24-28 may comprise a function that minimizes differences between the first RSSI data set and the second RSSI data set.

In example 30, the system of any of examples 24-29 may include a memory controller and an antenna to wirelessly receive the RSSI data.

In example 31, a wireless device includes a received signal strength indicator (RSSI) detector to determine RSSI information related to one or more WiFi access points, and a location engine to receive a cross-calibrated RSSI function for a first device type corresponding to the wireless device, the cross-calibrated RSSI function comprising a function that reduces differences between a respective first RSSI data set detected from a multiplicity of transmitting devices by the wireless device and a second RSSI data set detected from the multiplicity of transmitting devices by a second wireless device of a second device type; and to determine device location of the wireless device based upon the received RSSI data and received cross-calibrated RSSI function.

In example 32, the first RSSI data set of the example 31 may include WiFi RSSI data detected by a first wireless device of the first device type at a first set of locations from a multiplicity of WiFi access points, and the second RSSI data set may include WiFi RSSI data detected by the second wireless device at a second set of locations from the multiplicity of WiFi access points.

In example 33, the first RSSI data set of any of examples 31-32 may include a first set of location tags that identify the first set of locations and corresponding WiFi RSSI reports, and the second RSSI data set may include a second set of location tags that identify the second set of locations and corresponding WiFi RSSI reports.

In example 34, the first and second set of location tags of any of examples 31-33 may be determined by simultaneous localization and mapping using inertial sensor measurement and/or virtual landmark detection, and the first set of locations and second set of locations disposed along a common measurement trajectory.

In example 35, the retrieved cross-calibrated RSSI function of any of examples 31-34 may comprise a function derived from a least squares calibration, a Chi squared calibration, a Gaussian reshape calibration, or a Max/min reshape calibration.

In example 36, the cross-calibrated RSSI function of any of examples 31-35 may comprise a function that minimizes differences between the first RSSI data set and the second RSSI data set.

The embodiments, as previously described, may be implemented using various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

In some embodiments, an element is defined as a specific structure performing one or more operations. It may be appreciated, however, that any element defined as a specific structure performing a specific function may be expressed as a means or step for performing the specified function without the recital of structure, material, or acts in support thereof, and such means or step is meant to cover the corresponding structure, material, or acts described in the detailed description and equivalents thereof. The embodiments are not limited in this context.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
   a memory to store a first radio signal strength indicator (RSSI) data set comprising first data entries for RSSI detected from a multiplicity of transmission sources by a first wireless device of a first device type, and to store a second RSSI data set comprising second data entries for RSSI detected from the multiplicity of transmission sources by a second wireless device of a second device type; and
   a cross-device radio calibration engine to receive the first RSSI data set and second RSSI data set and generate a cross-calibrated RSSI function comprising a function that reduces differences between the first RSSI data set and the second RSSI data set.

2. The apparatus of claim 1, the first device type differing from the second device type in transceiver design, antenna placement, and/or radio calibration.

3. The apparatus of claim 1, the first data entries comprising WiFi RSSI data detected at a first instance by the first wireless device at a first set of locations from a multiplicity of WiFi access points and the second data entries comprising WiFi RSSI data detected at a second instance by the second wireless device at a second set of locations from the multiplicity of WiFi access points.

4. The apparatus of claim 3, the cross-device radio calibration engine to filter out WiFi measurements resulting from WiFi access points whose transmission power or location has changed between the first and second instance.

5. The apparatus of claim 3, the first RSSI data set comprising a first set of location tags that identify the first set of locations and corresponding WiFi RSSI reports and second RSSI data set comprising a second set of location tags that identify the second set of locations and corresponding WiFi RSSI reports.

6. The apparatus of claim 5, the first and second set of location tags determined by simultaneous localization and mapping using inertial sensor measurement and/or virtual landmark detections.

7. The apparatus of claim 5, the first set of locations and second set of locations disposed along a common measurement trajectory.

8. The apparatus of claim 1, the first RSSI data set and second RSSI data set each comprising RSSI data that spans a range of at least −30 dBm to −100 dBm.

9. The apparatus of claim 1, the cross-calibrated RSSI function comprising a function derived from a least squares calibration, a Chi squared calibration, a Gaussian reshape calibration, or a Max/min reshape calibration.

10. The apparatus of claim 1, the cross-calibrated RSSI function comprising a function that minimizes differences between the first RSSI data set and the second RSSI data set.

11. At least one non-transitory computer-readable storage medium comprising instructions that, when executed, cause a system to:
   receive a first radio signal strength indicator (RSSI) data set comprising data detected from a multiplicity of transmission sources by a first wireless device of a first device type;
   receive a second RSSI data set comprising data detected from the multiplicity of transmission sources by a second wireless device of a second device type; and generate a cross-calibrated RSSI function comprising a function that reduces differences between the first RSSI data set and the second RSSI data set.

12. The at least one non-transitory computer-readable storage medium of claim 11 the first RSSI data set comprising WiFi RSSI data detected by the first wireless device at a first set of locations from a multiplicity of WiFi transmission sources and the second RSSI data comprising WiFi RSSI data detected by the second wireless device at a second set of locations from the multiplicity of WiFi transmission sources.

13. The at least one non-transitory computer-readable storage medium of claim 11, the first RSSI data set comprising a first set of location tags that identify the first set of locations and corresponding WiFi RSSI reports and second RSSI data set comprising a second set of location tags that identify the second set of locations and the corresponding WiFi RSSI reports, the first and second set of location tags determined by simultaneous localization and mapping method using inertial sensor measurement and/or virtual landmark detection.

14. The at least one non-transitory computer-readable storage medium of claim 11, the first set of locations and second set of locations disposed along a common measurement trajectory.

15. The at least one non-transitory computer-readable storage medium of claim 11 comprising instructions that, when executed, cause a system to generate the cross-calibrated RSSI function by performing, using the first and second RSSI data sets, a least squares calibration, a Chi squared calibration, a Gaussian reshape calibration, or a Max/min reshape calibration, each calibration to minimize differences between the first RSSI data set and the second RSSI data set.

16. A method, comprising:
receiving a first radio signal strength indicator (RSSI) data set comprising data detected at a first instance from a multiplicity of transmission sources by a first wireless device of a first device type;
receiving a second RSSI data set comprising data detected at a second instance from the multiplicity of transmission sources by a second wireless device of a second device type; and
generating a cross-calibrated RSSI function comprising a function that reduces differences between the first RSSI data set and the second RSSI data set.

17. The method of claim 16, the first RSSI data set comprising WiFi RSSI data detected by the first wireless device at a first set of locations from a multiplicity of WiFi access points and the second RSSI data set comprising WiFi RSSI data detected by the second wireless device at a second set of locations from the multiplicity of WiFi access points.

18. The method of claim 17, the first RSSI data set comprising a first set of location tags that identify the first set of locations and corresponding WiFi RSSI reports and second RSSI data set comprising a second set of location tags that identify the second set of locations and corresponding WiFi RSSI reports, the first and second set of location tags determined by the simultaneous localization and mapping method using inertial sensor measurement and/or virtual landmark detection.

19. The method of claim 16, the first set of locations and second set of locations disposed along a common measurement trajectory.

20. The method of claim 16, comprising generating the first and second RSSI data set by filtering out WiFi measurements resulting from WiFi access points whose transmission power or location has changed between the first and second instance.

21. The method of claim 16 comprising generating the cross-calibrated RSSI function by performing, using the first and second RSSI data sets, a least squares calibration, a Chi squared calibration, a Gaussian reshape calibration, or a Max/min reshape calibration.

22. The method of claim 16 the cross-calibrated RSSI function comprising a function that minimizes differences between the first RSSI data set and the second RSSI data set.

23. A system, comprising:
an interface to receive received signal strength indicator (RSSI) data for a first wireless device of a first device type; and
a location engine to receive a cross-calibrated RSSI function for the first device type, the cross-calibrated RSSI function comprising a function that reduces differences between a respective first RSSI data set detected from a multiplicity of transmitting devices by the first wireless device and a second RSSI data set detected from the multiplicity of transmitting devices by a second wireless device of a second device type; and to determine device location of the first wireless device based upon the received RSSI data and received cross-calibrated RSSI function.

24. The system of claim 23, the first RSSI data set comprising WiFi RSSI data detected by the first device at a first set of locations from a multiplicity of WiFi access points, and the second RSSI data comprising WiFi RSSI data detected by the second wireless device at a second set of locations from the multiplicity of WiFi access points.

25. The system of claim 23, the first RSSI data set comprising a first set of location tags that identify the first set of locations and corresponding WiFi RSSI reports, and second RSSI data set comprising a second set of location tags that identify the second set of locations and corresponding WiFi RSSI reports.

26. The system of claim 25, the first and second set of location tags determined by simultaneous localization and mapping using inertial sensor measurement and/or virtual landmark detection, and the first set of locations and second set of locations disposed along a common measurement trajectory.

27. The system of claim 23, the retrieved cross-calibrated RSSI function comprising a function derived from a least squares calibration, a Chi squared calibration, a Gaussian reshape calibration, or a Max/min reshape calibration, each calibration to minimize differences between the first RSSI data set and the second RSSI data set.

28. The system of claim 23 comprising a memory controller and an antenna to wirelessly receive the RSSI data.

* * * * *